United States Patent [19]

Gilchrist, Jr.

[11] Patent Number: 5,181,798
[45] Date of Patent: Jan. 26, 1993

[54] DOUBLE PIPE TURNTABLE AND STINGER

[75] Inventor: Robert T. Gilchrist, Jr., Houston, Tex.

[73] Assignee: Shell Oil Company, Houston, Tex.

[21] Appl. No.: 759,327

[22] Filed: Sep. 13, 1991

[51] Int. Cl.⁵ .................................................. F16L 1/12
[52] U.S. Cl. .................................... 405/170; 405/171; 405/173; 405/168.1; 405/156
[58] Field of Search ...................... 405/158, 156, 168.1, 405/169, 170, 171, 173

[56] References Cited

U.S. PATENT DOCUMENTS

| | | | |
|---|---|---|---|
| 4,159,189 | 6/1979 | Todd et al. | 405/171 X |
| 4,234,268 | 11/1980 | Scodino | 405/158 |
| 4,436,449 | 3/1984 | Smoot et al. | 405/158 X |
| 4,444,528 | 4/1984 | Scodino et al. | 405/173 |
| 4,483,563 | 11/1984 | van der Heyden | 294/90 |
| 4,541,754 | 9/1985 | Castel et al. | 405/168.1 |
| 4,662,784 | 5/1987 | Hipp | 405/170 X |
| 4,867,605 | 9/1989 | Myers et al. | 405/169 |
| 4,881,850 | 11/1989 | Abreo, Jr. | 405/169 |
| 4,899,822 | 2/1990 | Daeschler et al. | 405/169 X |

OTHER PUBLICATIONS

"Deepwater Pipeline Repair Methods, Method Summaries" by C. G. Langner, Proposal Presentation Mtg., Nov. 10, 1988, Shell Development Company.
"Deepwater Vertical Pipelay from a Dynamically Positioned MODU" by Florence et al, OTC Paper 6729, May 6-9, 1991, Houston, TX, OTC Conf.

Primary Examiner—David H. Corbin
Assistant Examiner—J. Russell McBee
Attorney, Agent, or Firm—Del S. Christensen

[57] ABSTRACT

A pipelay apparatus and method comprising a steel turntable and a stinger pipe guide which can be supported on the construction deck of a repair vessel or drill ship are provided. The turntable is framed so that loads from two hanging pipes can be securely supported. The table-supported framing members can be moved so the load centerline for each pipeline can be placed an appropriate distance from the center of turntable rotation, which is useful where the two pipelines are of different diameters. This apparatus permits a vessel to simultaneously handle different sizes of pipe and pass large diameter appurtenances without modifying the stinger pipe guide.

18 Claims, 6 Drawing Sheets

DOUBLE PIPE TURNTABLE AND STINGER

FIELD OF THE INVENTION

This invention relates to an apparatus and method for repairing subsea pipelines.

BACKGROUND OF THE INVENTION

Development of oil and gas fields in relatively deep sea waters has resulted in a proliferation of pipelines connecting facilities to each other and to shore facilities. Many of these pipelines are at depths which are deeper than those at which divers can work. The pipelines are expected to have long service lives, but eventually dropped objects, mud slides, corrosion damage, material flaws or other failure mechanisms will affect these pipelines and require repair or replacement. Acceptable methods to perform repairs on these pipelines are not currently available.

U.S. Pat. Nos. 4,234,268 and 4,444,528 disclose methods to sever and lift subsea pipelines to the surface, but handling of the pipelines by surface ships is not addressed. Pipelines can therefore be recovered from the sea floor to surface vessels, but existing surface vessels have facilities to handle only one pipe. Repairing a pipeline by a method which includes lifting the pipe to the surface from both directions of the pipeline could not be easily accomplished by the prior art. It is therefore an object of the present invention to provide an apparatus and a method which is useful in repairing subsea pipelines wherein two ends of the pipe can be suspended, raised and lowered from a surface vessel, and the surface vessel can maneuver around the pipelines without changing the position of the pipelines relative to each other. It is a further object to provide such a method and apparatus wherein pipeline appurtenances such as anodes and hang-off clamps can be raised and lowered from the ship. It is a further object to provide such an apparatus and method which can be readily adapted for use from different existing pipeline-laying ships.

SUMMARY OF THE INVENTION

These and other objects are accomplished by an apparatus for supporting a plurality of pipes from a ship comprising:

a) a horizontal circular rotatable turntable which can rotate relative to the ship, and from which the plurality of pipes may be suspended;

b) a stinger which is symetrical about a vertical axis, the stinger being fixed to the ship and not rotatable with the turntable, located below the rotatable turntable with an inside diameter large enough to pass the plurality of pipes, and fluted outward as it extends downward; and c) a means to support the plurality of pipes essentially vertically from the turntable against an inner diameter of the stinger.

These and other objects are also accomplished by a method for repairing a subsea pipeline having a damaged segment between lengths of undamaged pipe comprising the steps of:

a) severing the pipeline in the vicinity of the damaged segment;

b) lifting a first severed end of the pipeline to surface vessel;

c) supporting the first severed end essentially vertically from a rotatable turntable on the surface vessel;

d) removing any damaged pipe from the first end of the pipe;

e) adding pipe to the first end of the pipeline until the surface vessel can be positioned approximately above the second end of the pipeline which remains at the sea floor;

f) dropping a support member which is supported from the rotatable turntable to the second end of the pipeline which remains on the sea floor;

g) connecting the support member to the pipeline which remains on the sea floor in the vicinity of the second end;

h) alternately lifting the support member and adding pipe to the first end of the pipe until the second end of the pipe can be supported by the rotatable turntable;

i) removing any damaged pipe from the second end of the pipe;

j) connecting the first and the second end of the pipe; and k) laying the connected first and second pipe down onto the sea floor.

This apparatus and method provides an economical solution to the problem of having to repair subsea pipelines which are at depths beyond the capabilities of divers. The pipes are safely and conveniently supported from a rotatable turntable about which the ship, and a symetrical stinger, can rotate to maintain a heading which is independent of the pipeline configuration. Pipes can be raised or lowered one joint at a time in an alternating fashion without having to pass a pipe into or out of a working bay. While both pipes are being supported, the rotatable turntable permits the surface vessel to vary headings without altering the relative positions of the pipes

DETAILED DESCRIPTION OF THE INVENTION

Figure 1:
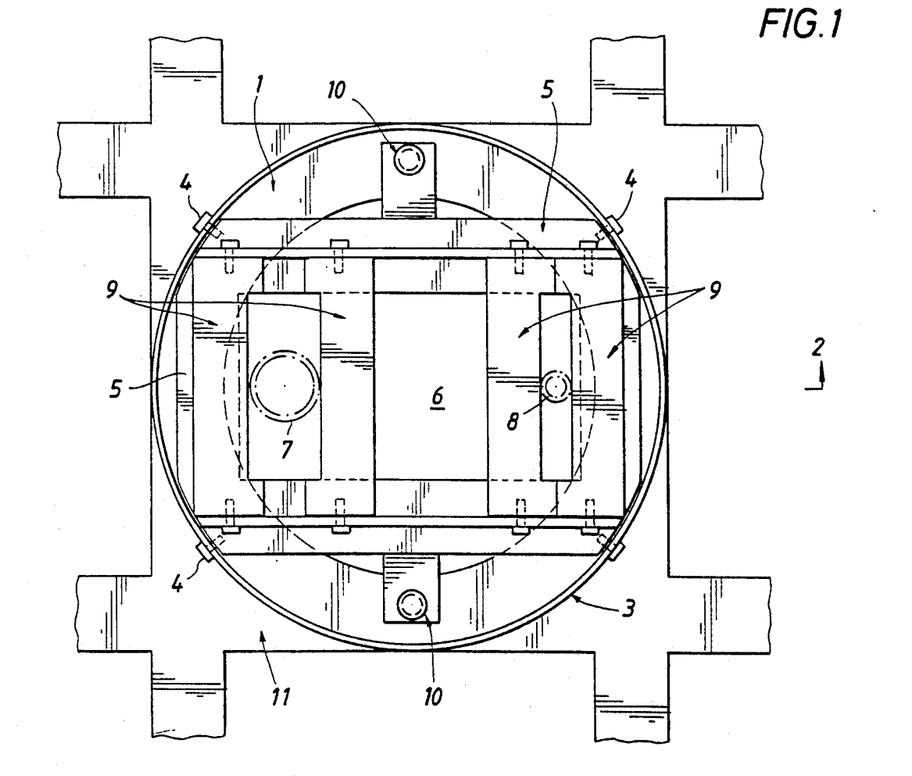
FIG. 1 is a top view of the turntable of this invention.

Referring to FIGS. 1-7, the turntable and stinger of the present invention are shown. FIG. 1 is a plan view looking down at the turntable. A circular support member, 1, rests on a circular bearing plate, 2, which is fixed to a pipeline repair vessel. The circular bearing plate, 2, is preferably affixed to the vessel frame, 11. A circular curb, 3, keeps the rotating turntable centered. The circular curb, 3, can have holes drilled radially through the curb for the purpose of supporting locking pins, 4. Four locking pins are shown in FIG. 1. The diameter of the rotatable turntable is preferably between about 10 and about 12 feet. This size turntable can fit over the work bay of many existing drilling ships, but is large enough to support at least two relatively large pipes. Preferably, from 10 thousand to about 750 thousand pounds of pipe can be supported by the turntable. A rectangular frame, 5, is centered on the circular support member, 1, and is integral with the circular support member. The rectangular frame, 5, defines a rectangular opening, 6, within which at least two pipes, 7 and 8, can be supported. The pipes are supported by casing elevators (not shown) which rest on two cross members, 9.

The circular support member may be rotated by pulling about tangentially from fixed points on the ship by, for example, tugger lines. Rotation posts, 10, may be provided to enable pulling the turntable to different positions. Of course, gears and a motor could be provided to rotate the turntable to new positions. Motors and gears are not preferred due to the expense and complication they add to the apparatus.

Figure 2:
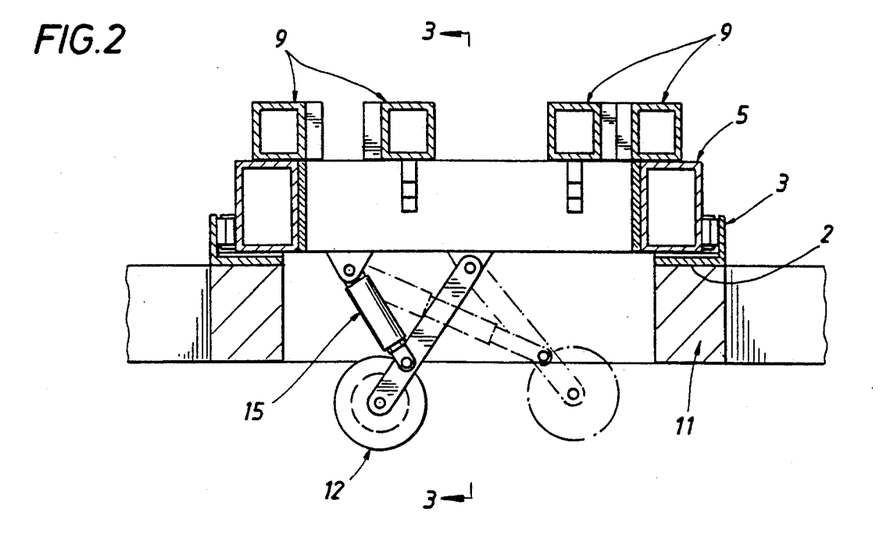
FIG. 2 is a section view through a vertical cross section of the turntable of this invention.
Figure 3:
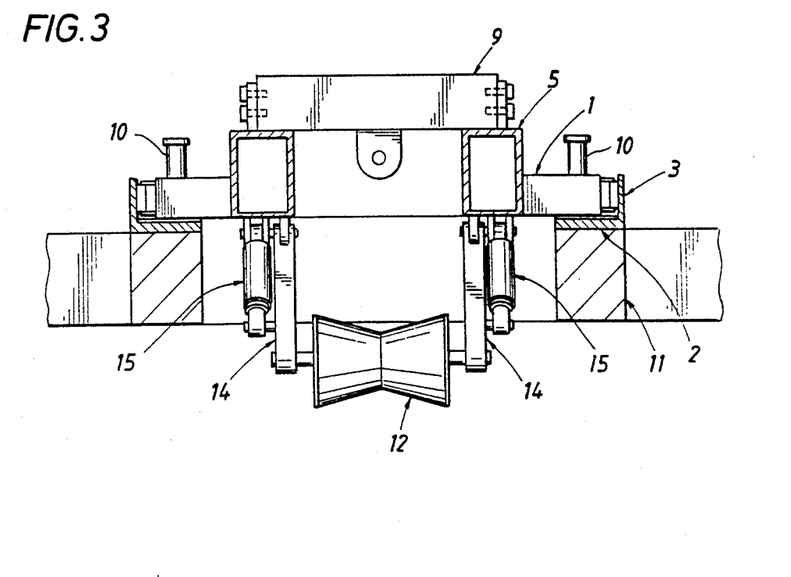
FIG. 3 is a view through another vertical section through the turntable.

FIGS. 2 and 3 show a reaction roller, 12, which is capable of pressing a pipe which is suspended from the turntable against the inside surface of the stinger (not shown in FIGS. 1, 2 or 3). The reaction roller can be supported by two swinging arms, 14. The position of the reaction roller can be controlled by, for example, hydraulic arms, 15. Both the hydraulic arms, 15, and the swinging arms, 14, can be fixed to the rotating elements. Preferably, the swinging arms and hydraulic arms are fixed to the rectangular frame due to the rigidity required of the rectangular frame. The reaction roller bends the pipe to match the contour of the stinger and reduces side load on the turntable crossmembers.

FIGS. 4 through 7 show the stinger which is fixed below the turntable, extending into the sea below the pipeline repair vessel. The stinger may be from about 40 to about 60 feet long, and is fluted outward. The angle from vertical of a pipe following the stinger downward will be about 12°. The diameter of the top opening of the pipe guide stinger is much larger than the diameter of the pipe itself because it is designed to safely guide the pipe from a position in the turntable that is eccentric to the center of stinger symetry. The stinger inside diameter must also pass a plurality of pipes, which are supported from the turntable. The stinger preferably has inner diameter of between 6 and about 15 feet. The stinger comprises concentric circular bumpers, 17, which increase in diameter with increasing depth. The bumpers may be separated by, for example, about 6 feet. The bumpers could be circular, but fabrication is simplified by utilizing a member of multiple straight edges which approaches a circle, such as an octagon (shown in FIGS. 4–7), hexagon, or decagon. The bumpers may be rolling bumpers, but stationary bumpers are preferred due to simplicity and expense. The bumpers may be supported from vertical stringers, 18, which are reinforced by crossbracing, 19. For convenience of installation and handling, the vertical stringers may be flanged at one or more levels by flanges, 57. The outward "flute" of the bumpers preferably controls the curvature of the suspended pipe so that excessive bending strains are avoided. The angle from vertical is thus increased by about 1° to 2° for each 6-foot descent. Greater curvatures are possible with smaller diameter pipes, and less curvature is preferred for larger diameter pipes.

Figures 4, 5:
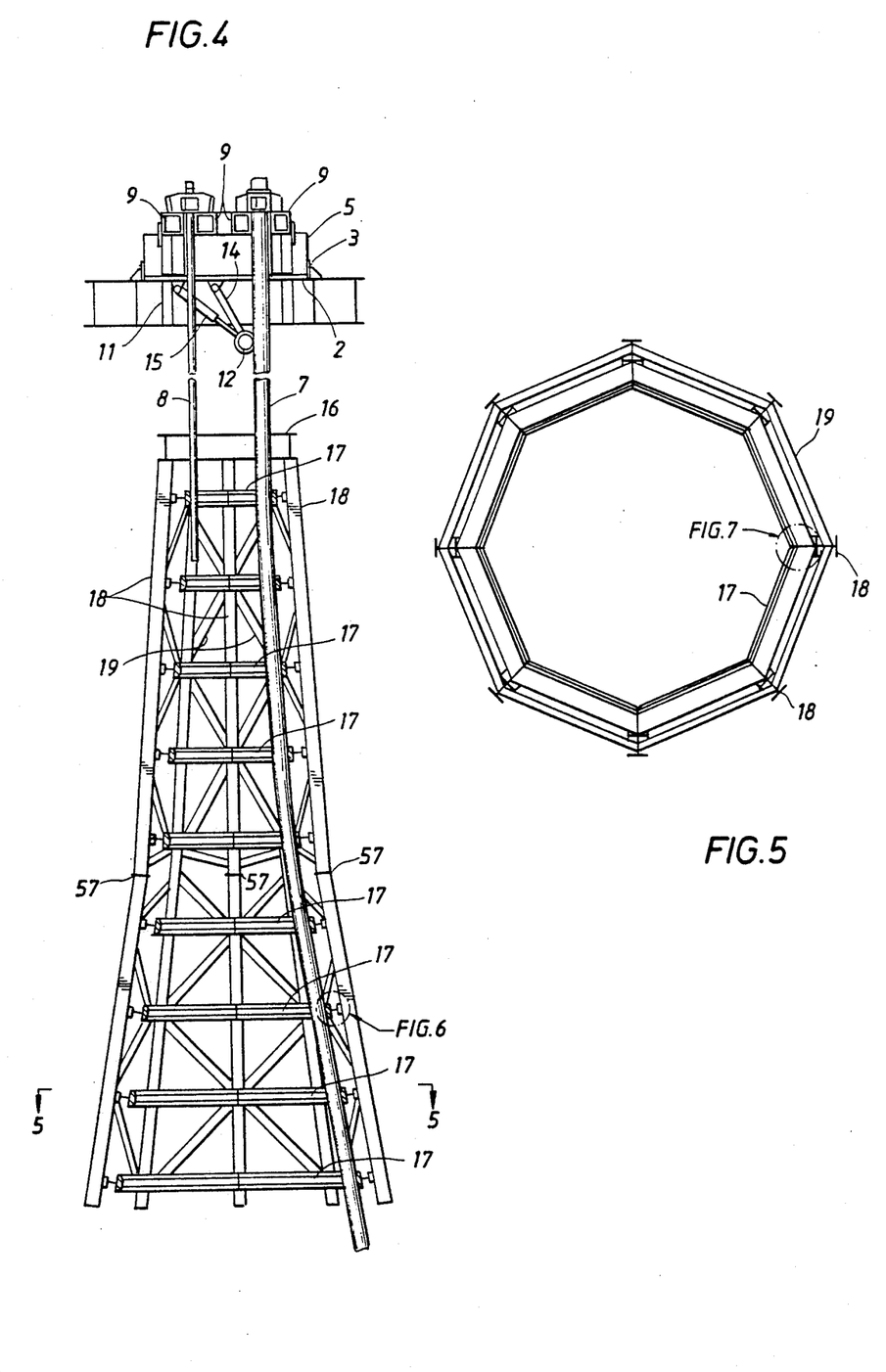
FIG. 4 is a sectional view through a vertical section of a stinger which is useful in this invention.
FIG. 5 is a sectional view through horizontal section of the stinger of FIG. 4.

A view through section 5—5 from FIG. 4 is shown in FIG. 5.

Figure 6:
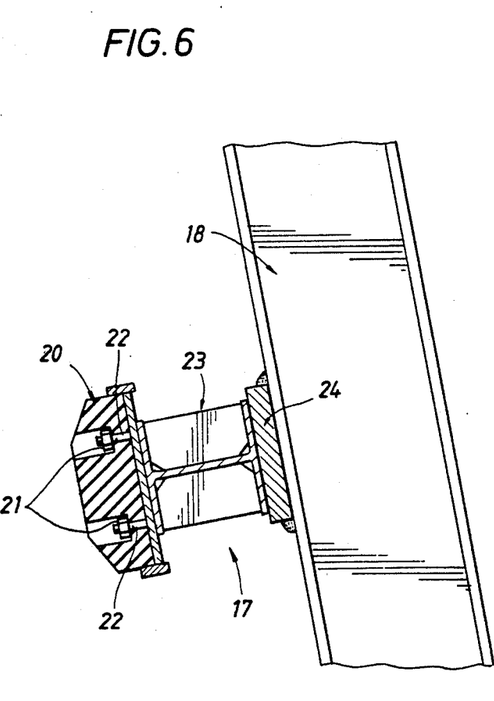
FIG. 6 is a detail of a bumper of the stinger of FIG. 4.
Figure 7:
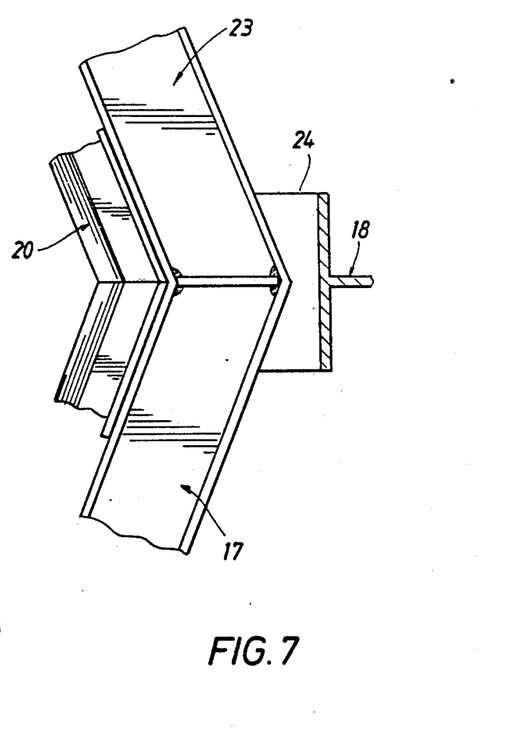
FIG. 7 is another detail of the bumper of the stinger.

Details of the support of the bumper, 17, from the stringers, 18, are shown in FIGS. 6 and 7. A relatively low friction skid pad is provided by a 4-inch thick ultra high density polyethylene marine facing, 20, which is connected by nuts, 21, which are threaded onto studs, 22. The studs are connected to a bumper support beam, 23. The bumper support beam may be separated from the vertical stringer by a steel bolster, 24, to provide angle and distance from the stinger centerline.

This apparatus can support heavy pipelines by pipe elevators which are clamped onto the pipelines by resting the elevators on the crossmembers, 9. These crossmembers can be easily moved to pass appurtenances, such as anodes, flanges, valves, clamps, or buckle arrestors. Further, the apparatus of this invention can relatively quickly be installed on many different drilling vessels. A vessel to repair pipelines can therefore be quickly prepared without requiring that a large amount of capital be invested.

Referring to FIGS. 8a through 8h, steps of the method of repairing a pipeline according to this invention are shown. A surface ship, 31, is shown with a derrick, 32, supporting sheaves (not shown) capable of lifting and supporting the pipeline which is to be repaired by cables. The turntable is within a work bay of the ship, and is not shown. The lower end of the stinger is shown sticking out from the bottom of the repair ship. A clamp, 33, is suspended through the turntable and to the sea floor by a support member such as a string of drill pipe, 34. The clamp is one which can be connected to the subsea pipeline, 35, in the vicinity of a leak, 36.

Figure 8A:
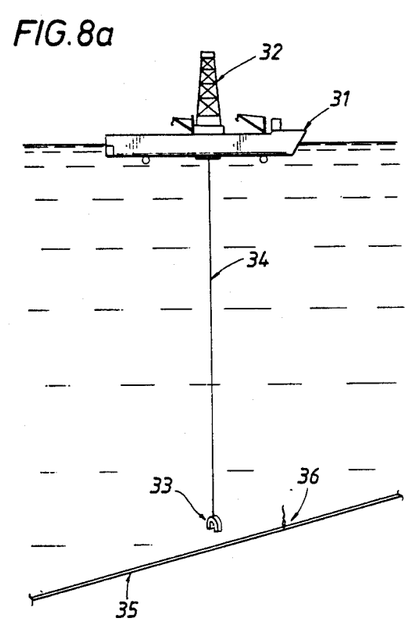
FIGS. 8a through 8h show various steps of the method of this invention.
Figure 8B:
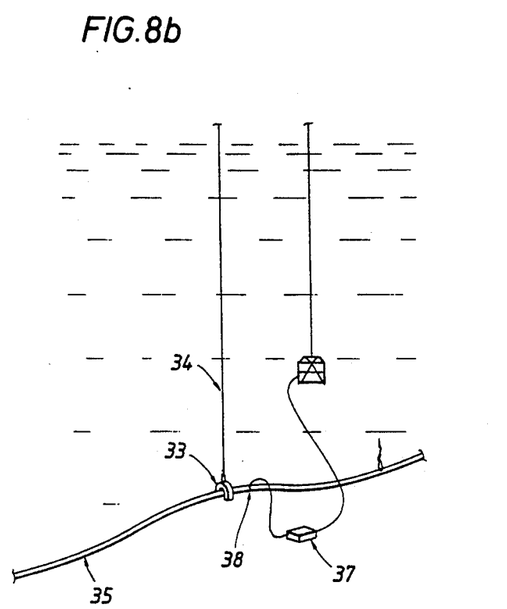

FIG. 8b shows a Remote Operated Vehicle (ROV), 37, which is in the process of placing a shaped charge, 38, on the pipeline between the damage, 36, and the location of the clamp. Of course, other methods to sever the pipeline may be used in place of the shaped charge, but the shaped charge is preferred due to its reliability and quickness. The clamp may be used to pull the pipeline out of sea bed sediment to enable access around the full diameter of the pipeline.

Figure 8C:
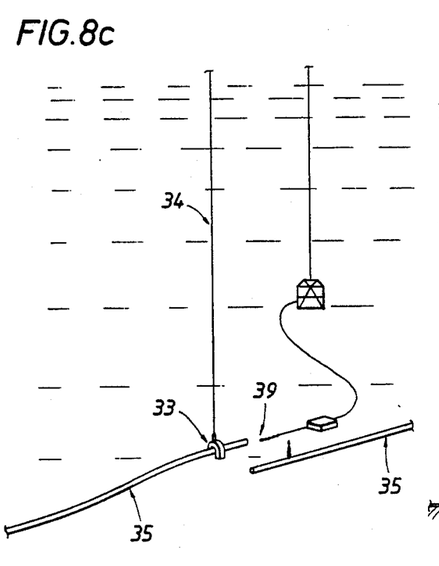

FIG. 8c shows the severed pipeline, 35, being supported above the sea floor by the clamp, 33, and drill string, 34. The ROV, 37, is shown in the process of placing a plug/pig stopper, 39, in the severed end of the pipeline. Providing this plug/pig stop also enables the pipeline to be dewatered before it is lifted. This optional measure greatly reduces the required lifting force. The pipeline can be sealed off with a plug or packer in order to prevent loss of contents to the environment. The plug/pig stop is typically an expandable packer type internal clamp such as that disclosed in U.S. Pat. No. 4,234,268. A clamp which latches onto raised ridges of the pipeline (anodes or buckle arrestors) such as that disclosed in U.S. patent application Ser. No. 735,505 may also be utilized. A drillstring can be sufficiently strong to support lifting a pipeline, and is conveniently handled by adding or removing joints of pipe.

Figure 8D:
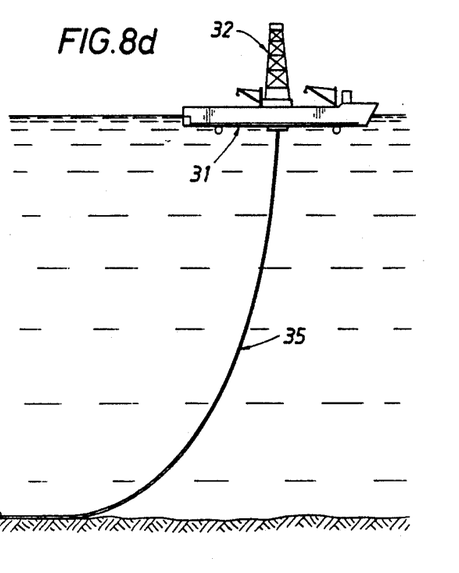

FIG. 8d shows the surface vessel supporting the end of the pipeline after the drillstring has been lifted and removed. Lifting the pipe will cause the ship to move along the pipeline away from the point at which the pipeline was damaged. Segments of new pipe can then be added until the surface ship is again positioned approximately over the severed end of the pipeline on the ocean floor. Of course, the damaged portion of the pipeline could have been raised with the first severed end of the pipeline to be lifted. If a damaged portion is lifted with the first severed end of the pipeline, it should be removed before good pipe is added.

Figure 8E:
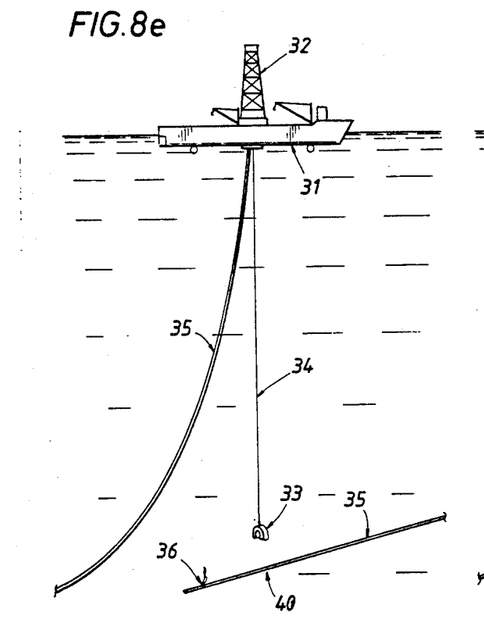

FIG. 8e shows the surface ship, 31, positioned approximately over the damaged portion of the pipeline, 36, and supporting the pipeline which was added to the first severed end. A clamp, 33, suspended from a support member, 34, such as a drillstring, is being lowered into position over the severed end of the pipeline which remains on the sea floor, 40. Alternatively, damaged portion could be severed from undamaged pipeline, and the damaged portion abandoned at the sea floor. This may be particularly advantageous if an extended portion of the pipeline is damaged or if the precise point of damage cannot be ascertained.

Figure 8F:
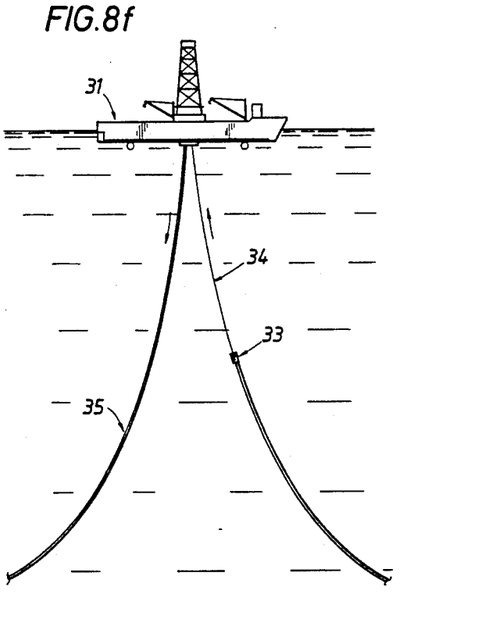

FIG. 8f shows the second reach of pipeline being lifted toward the surface ship, 31. To lift this pipe toward the surface ship, pipe must be added to the first end of the pipeline which is being supported from the surface ship alternating with lifting the end of the second reach of pipeline. Eventually, the support member is completely recovered, and any damaged pipe on the second severed end of the pipeline to be lifted is removed. The surface vessel is then supporting, by the rotatable turntable of the present invention, two undamaged reaches of pipe.

Figure 8G:
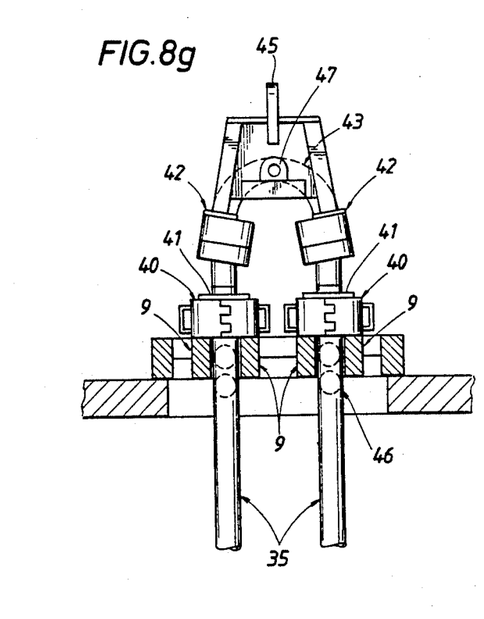

FIG. 8g shows a short radius fitting which may be utilized to connect two undamaged ends of pipeline which are supported by the turntable of the present invention. Elevators, 41, are shown supporting the pipes, 35, the elevators resting on cross members, 9. The elevators of FIG. 8g are shown supporting the pipeline at flanges, 41, which can be, for example, buckle arrestors or anodes. Misalignment flanges, 42, are preferred for connecting the ends of pipeline to a short radius elbow, 43. The misalignment flanges and short radius elbow are connected to a lifting bracket, 44, with a pad eye, 45. The assembly is strong enough to support the weight of the two suspended pipe spans. Dewatering pigs, 46, may be placed inside the pipeline to enable dewatering the pipelines from the short radius spool outward, by injection of a gas. If dewatering from the short radius spool is contemplated, a gas injection port, 47, should be provided. After dewatering through the injection port, the gas source (typically compressed air or nitrogen) can be disconnected and the connection port sealed off without depressuring the pipeline itself. This prevents the equilibration of liquid levels that occur upon depressurization and allows the suspended section of the pipeline to remain free of liquid without displacing liquid from the entire reach of pipe.

Figure 8H:
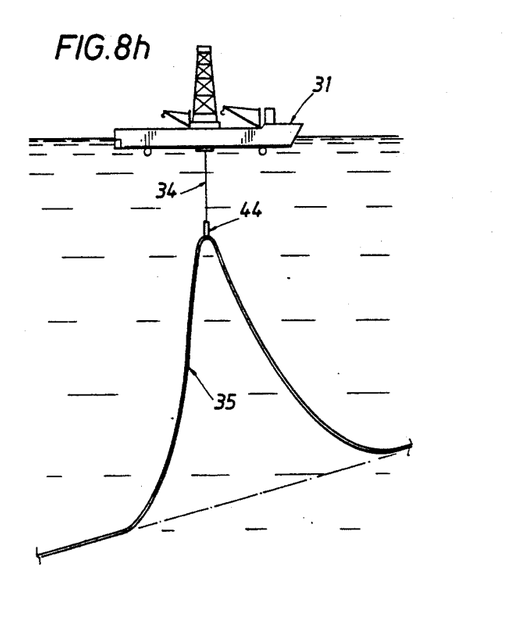

The pipeline is then layed back down onto the sea floor as shown in FIG. 8h. A support member, 34, such as a drillstring, is connected to the bracket on the misalignment flanges, 44. The support member is preferably connected to the bracket, 44, by a connector which can be removed and retrieved as the pipe is laid down. A hook which will fall out of the pad eye as weight is taken off the hook such as a J hook can be utilized. A hook which can be removed by a ROV can be used. U.S. Pat. No. 4,483,563 discloses a suitable hook which disconnects from a load when the weight of the load is removed. This hook can also be utilized to again pick up the pipeline if it is necessary to do so.

Figure 9:
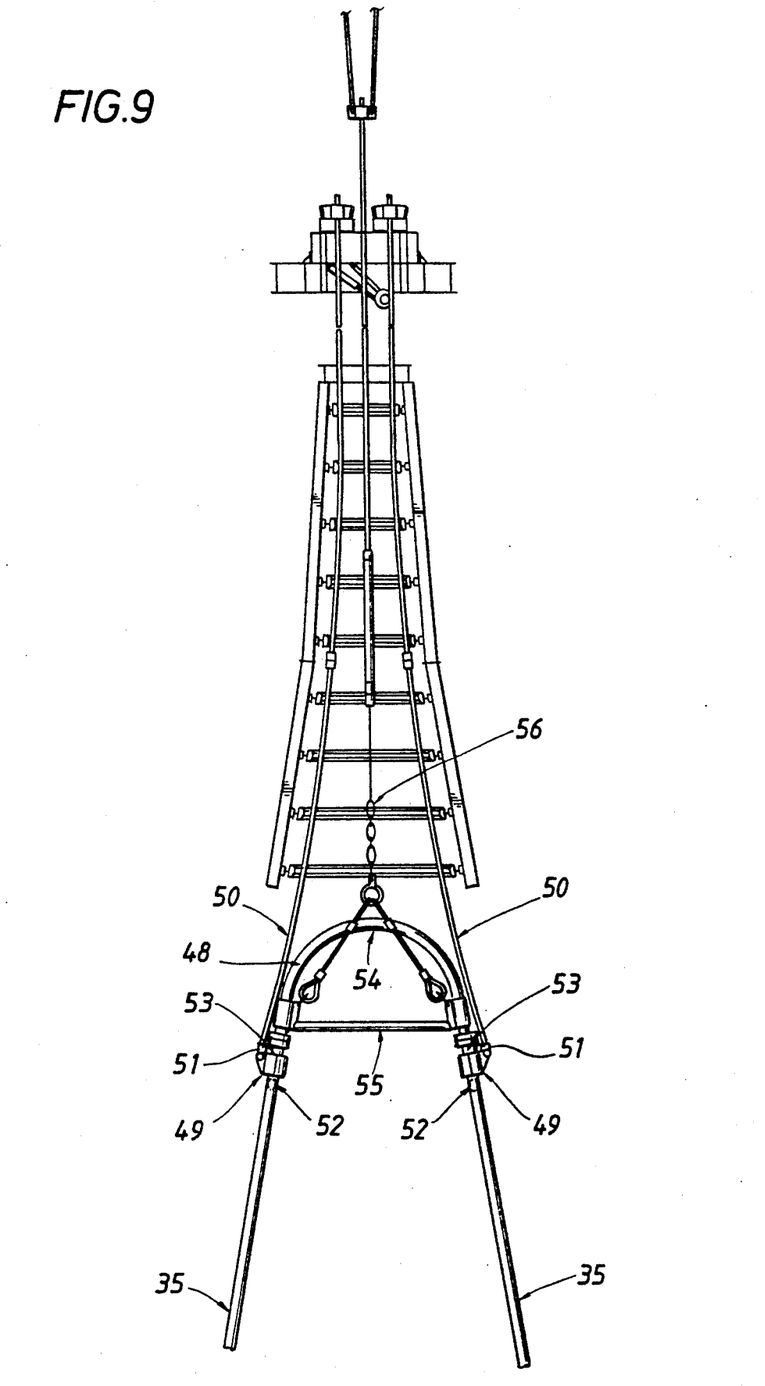
FIG. 9 is a schematic drawing showing the installation of a long radius spool connecting undamaged portions of a pipeline according to this invention.

Referring to FIG. 9, stinger and turntable are shown being utilized to lower a pipeline which has been connected utilizing a long radius spool, 48. A long radius spool may be necessary in order to ensure that logging and inspection pigs can be forced through the spool. A large radius spool is one which will not pass through the turntable when cross members are removed, and the spool is connected to the pipe ends. Use of a long radius spool is not preferred due to the necessity of handling the spool below water and off the deck of the surface vessel. When a large radius spool is utilized, hang off clamps, 49, can be attached to the pipes, 35, and then the pipes are lowered on drill pipes, connected to the hang-off clamps by a drill pipe clevis, 51. Water exclusion plugs, 52, may be inserted into the open ends of the pipes, 35, to keep water from filling the pipes as they are lowered to below water level. Flanges, 53, that can be made up to the long radius spools are fitted to the top of the pipes before they are lowered on the drill pipes. Because the long radius spool, 54, cannot pass through the opening in the turntable, it must be lowered over the side of the surface ship and maneuvered into position over the flanges, 53, when the pipe ends are lowered to a position below the stinger, as shown in FIG. 9. The spool and the pipe ends may be made up by divers after the spool piece, 54, is positioned on the pipe end flanges, 53. The spool piece is preferably lowered with a bracket, 55, attached, the bracket being sufficiently strong to enable laying down the pipeline by a support which is connected to the bracket. With the long radius spool made up to the flanges on the pipe ends, a support means, 56, can be attached to the bracket to enable laying the pipe and spool onto the sea floor. The support means for the long radius spool does not differ from that useful for the short radius spool. With the support means, 56, connected to the bracket, 55, the pipe and spool is supported by the support means. The drill pipes, 50, connected to the individual pipes may therefore be disconnected and the pipe then laid down onto the sea floor by lowering the support means, 56.

I claim:

1. An apparatus for supporting a plurality of pipes from a ship comprising:
    a) a horizontal circular rotatable turntable which can rotate relative to the ship, and from which the plurality of pipes may be suspended into water;
    b) a stinger which is symetrical about a vertical axis, the stinger being fixed to the ship and not rotatable with the turntable and located below the rotatable turntable, with an inside diameter large enough to pass the plurality of pipes, and fluted outward as it extends downward; and
    c) a means to support the plurality of pipes essentially vertically from the turntable against an inner diameter of the stinger.

2. The apparatus of claim 1 wherein the stinger comprises a plurality of horizontal circular supports of internal diameters which increase with depth.

3. The apparatus of claim 1 wherein the means to support the pipes comprises a support collar surrounding each pipe and having an outer diameter which is larger than the outer diameter of the pipe and which can support the pipe, and two movable beams for each pipe to be supported which can be positioned on the turntable at a distance from each other that is greater than the outer diameter of the pipe and less than outer diameter of the support collar.

4. The apparatus of claim 3 wherein the support collar supports the pipe by supporting a raised radial ridge which is an integral part of the pipe.

5. The apparatus of claim 3 wherein the support collar supports the pipe by clamping onto the pipe with sufficient force that the pipe can be supported by the frictional forces of the collar against the pipe.

6. The apparatus of claim 1 wherein the stinger comprises a plurality of rings of diameters which increase with vertical distance from the turntable.

7. The apparatus of claim 3 wherein the support collar comprises a plurality of rings extending radially from the outer diameter of the support collar by which the support collar and pipe can be lifted.

8. The apparatus of claim 1 wherein the inner diameter of the stinger is between about 6 and about 15 feet.

9. The apparatus of claim 1 wherein the outer diameter of the turntable is between about 10 and about 12 feet.

10. The apparatus of claim 7 further comprising a hoist which is capable of being positioned above the end of the pipe being supported and is capable of lifting the pipe for the purpose of changing the vertical position of the pipe.

11. The apparatus of claim 1 wherein the weight of pipe which can be supported is in the range of about 10,000 to about 750,000 pounds.

12. The apparatus of claim 1 further comprising at least one reaction roller, the roller being suspended from and fixed to the turntable, and capable of pressing a pipe which is suspended from the turntable against the stinger.

13. A method to repair a subsea pipeline having a damaged segment between lengths of undamaged pipe comprising:
   a) severing the pipeline in the vicinity of the damaged segment;
   b) lifting a first severed end of the pipeline to a surface vessel;
   c) supporting the first severed end essentially vertically from a rotatable turntable on the surface vessel;
   d) removing any damaged pipe from the first end of the pipe;
   e) adding pipe to the first end of the pipeline until the surface vessel can be positioned approximately above the second end of the pipeline which remains at the sea floor;
   f) dropping a support member which is supported from the rotatable turntable to the second end of the pipeline which remains on the sea floor;
   g) connecting the support member to the pipeline which remains on the sea floor in the vicinity of the second end;
   h) alternately lifting the support member and adding pipe to the first end of the pipe until the second end of the pipe can be supported by the rotatable turntable;
   i) removing any damaged pipe from the second end of the pipe;
   j) connecting the first and the second end of the pipe; and
   k) laying the connected first and second pipe down onto the sea floor.

14. The method of claim 13 wherein the first and the second ends of the pipes are connected by a short-radius spool while both pipes are supported from the rotatable turntable.

15. The method of claim 13 wherein the support members are drillstrings.

16. The method of claim 13 wherein the subsea pipeline is severed using a shaped explosive charge.

17. The method of claim 13 wherein the surface vessel is a well drilling vessel which has been modified by addition of facilities comprising the rotatable turntable.

18. The method of claim 13 further comprising the step of dewatering the pipeline before it is laid down onto the sea floor.

* * * * *